July 18, 1967 M. ROLAND 3,331,354
BRAZING MATERIAL APPLICATOR
Filed May 21, 1963 3 Sheets-Sheet 1

INVENTOR.
MAX ROLAND
BY
Tilberry & Body
ATTORNEYS

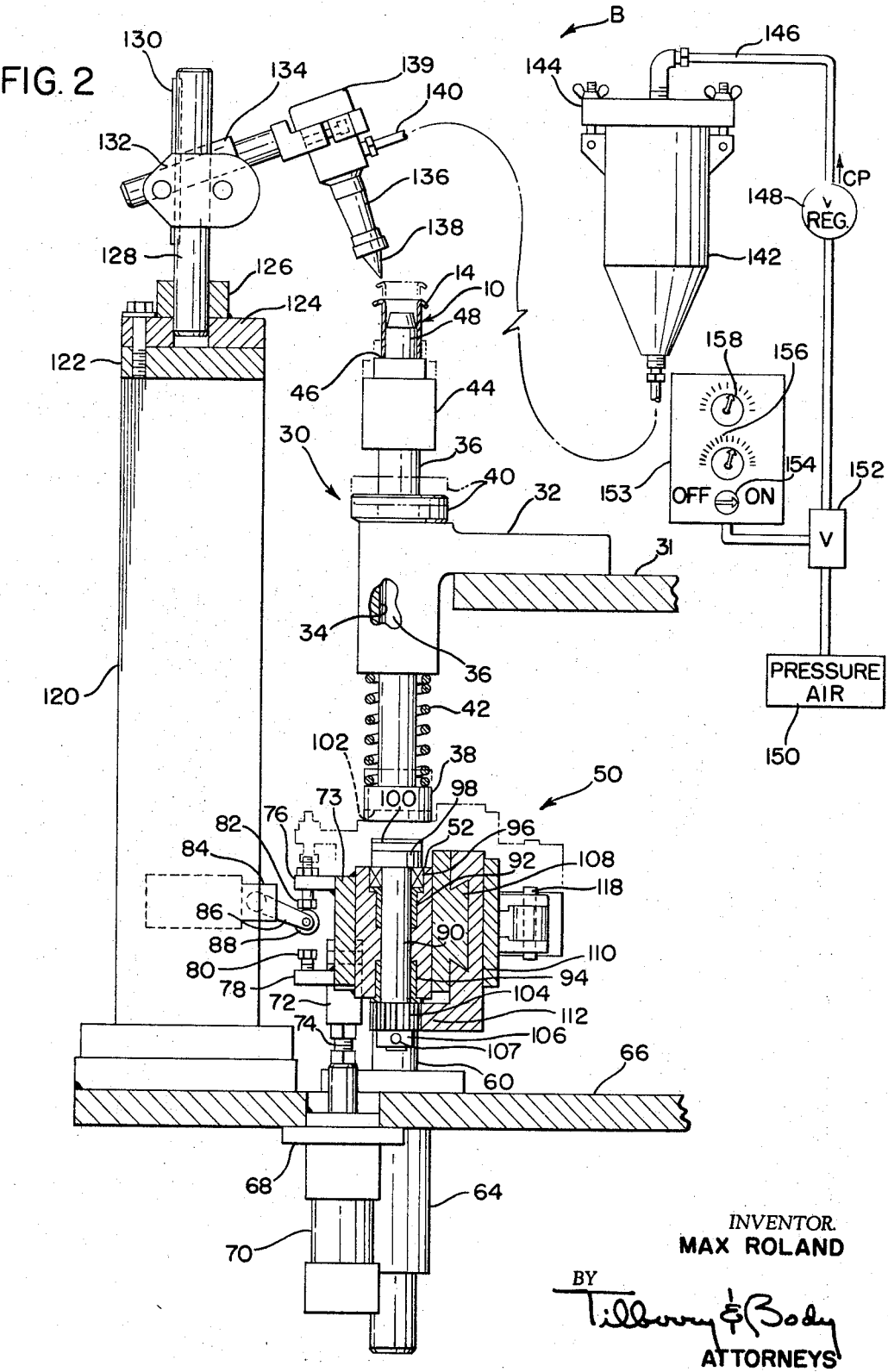

INVENTOR.
MAX ROLAND

United States Patent Office 3,331,354
Patented July 18, 1967

3,331,354
BRAZING MATERIAL APPLICATOR
Max Roland, Burlingame, Calif., assignor to The Ohio Crankshaft Company, Cleveland, Ohio, a corporation of Ohio
Filed May 21, 1963, Ser. No. 281,972
1 Claim. (Cl. 118—320)

The present invention pertains to the art of brazing and more particularly to an applicator for depositing brazing material onto a workpiece.

The invention is particularly applicable for applying a brazing material between a cylindrical shank and a knob casing adapted to be brazed together to form a doorknob unit and the invention will be discussed with particular reference thereto; however, it is to be appreciated that the invention has much broader applications and may be used in other similar brazing operations.

Recently there has been developed an apparatus for brazing a hollow knob casing onto a cylindrical shank by utilizing radio frequency induction heating which apparatus allows a substantial reduction in the amount of material necessary for construction of the doorknob unit and in the expense of manufacturing the same.

To accommodate the decorative contours of the knob casing, the cylindrical shank is provided with a mounting or brazing flange which is usually downwardly sloping and either concave or convex to match a corresponding interior surface in the casing. Before the casing is placed onto this mounting flange, a paste-like material including the brazing metal and the necessary flux compositions must be deposited onto the flange so that the abutting surfaces of the casing onto the flange so that the abutting surfaces of the casing and shank are substantially covered with the paste-like material after they are pressed together. This seemingly simple operation has posed a substantial obstacle to the final perfection of the radio frequency induction heating machine of the type described.

Heretofore it has been impossible to apply the paste-like brazing material onto the downwardly sloping mounting flange of the shank with the necessary uniformity to consistently produce a sound brazed joint between the casing and the shank so that the joint could withstand the maximum torque requirements which the doorknob must meet to be acceptable.

In the past the paste-like brazing material was applied onto the abutting surfaces between the casing and the shank by a dispenser spout under which the shank was rotatably mounted with the spout directed toward mounting flange thereof. As the shank was rotated, the paste-like material oozed from the spout onto the downwardly sloping flange. In this manner, there was deposited onto the flange a ring of brazing material; however, before the casing could be positioned onto the shank, some of this brazing material would slide from the flange and create areas on the flange which had an inadequate amount of brazing material or flux to produce a sound brazed joint. Further, the ring of brazing material would tend to shrink which forced the material from the flange and at the joint between the ends of the material, the material was either overlapped or separated. In an attempt to correct these problems, more paste-like material was deposited onto the flange of the shank; however, such an increase in the brazing material did not assure that the material would not slide from the downwardly sloping flange. In fact, as the amount of brazing material increased, there was a greater tendency for the material to slide from the flange. Not only did the loss of the paste-like material create inferior brazed joints, but also, the material would accumulate on the apparatus and would necessitate frequent shutdown to clean the apparatus.

Various solutions to the problem of maintaining the paste-like brazing material onto the downwardly sloping flange were attempted without success.

The present invention is directed toward an apparatus for applying the paste-like brazing material onto the mounting flange preparatory to mounting the knob casing thereon which apparatus does not require an excessive amount of paste-like material and prevents the loss of the brazing material from the downwardly sloping flange.

In accordance with the present invention, there is provided an apparatus for applying a paste-like brazing material onto a surface of a workpiece preparatory to brazing. The apparatus comprises an applicator means having a spout directed toward the surface, means for moving the workpiece relative to the spout, and means for pulsing the applicator means to deposit spaced heaps of the paste-like material onto the surface of the workpiece.

In accordance with the more limited aspect of the present invention, there is provided an apparatus for applying a paste-like brazing material onto the downwardly sloping circular flange of a sheet metal doorknob shank preparatory to brazing thereon a knob casing having a surface matching the flange. The apparatus comprises an applicator means having a spout directed toward the flange, means for causing relative movement of the spout around the flange, and means for pulsing the applicator means to deposit spaced heaps of paste-like material onto the flange.

In accordance with another aspect of the present invention there is provided a method of preparing the downwardly sloping flange of a doorknob shank for brazing comprising applying spaced heaps of paste-like brazing material onto the flange.

The primary object of the present invention is the provision of an apparatus for applying a paste-like brazing material onto a surface of a workpiece which apparatus deposits the material onto the workpiece in a manner that limits displacement of the material from the surface.

Another object of the present invention is the provision of an apparatus for applying a paste-like brazing material onto a sloping surface of a workpiece which apparatus deposits the material onto the workpiece in a manner that limits the sliding of the material from the sloping surface.

Yet another object of the present invention is the provision of an apparatus as defined above which apparatus deposits the paste-like material in spaced heaps along the surface.

Still a further object of the present invention is the provision of an apparatus as defined above which can vary the spacing between the heaps of paste-like material and/or the amount of material in each heap.

Another object of the present invention is the provision of an apparatus and method for applying a brazing material onto the downwardly sloping mounting flange of a doorknob shank which apparatus and method deposits the material in a manner to produce consistent, high quality brazed joints between the flange and a casing brazed thereto.

Yet another object of the present invention is the provision of an apparatus and method for applying a brazing material onto the downwardly sloping mounting flange of a doorknob shank which apparatus and method rotates the shank below a dispenser spout which deposits finite heaps of material onto the moving flange.

These and other objects and advantages will become apparent from the following description used to illustrate the preferred embodiment of the present invention as read in connection with the accompanying drawings in which:

FIGURE 2 is a side elevation, somewhat schematic, cross sectional view illustrating the preferred embodiment of the present invention;

Figure 1:
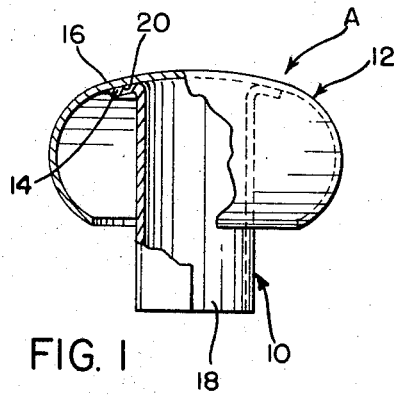
FIGURE 1 is a fragmentary, cross sectional view illustrating a doorknob constructed in accordance with the present invention.

Referring now to the drawings, wherein the showings are for the purpose of illustrating a preferred embodiment of the present invention only and not for the purpose of limiting same, FIGURE 1 shows a doorknob A combining a sheet metal shank 10 and a sheet metal knob casing 12 which parts are so formed that they may be brazed together by an appropriate radio frequency brazing apparatus, not shown. The shank 10 comprises a downwardly sloping mounting flange 14 having surface 16 which is illustrated as being convexed upwardly, but which could be concaved upwardly according to the shape of the inwardly facing surface on the knob casing 12. To secure the flange onto the inner surface of the casing 12, it is contemplated, in accordance with the present invention, to provide a brazed joint between the flange and the casing. By so constructing the doorknob A, there is required only two easily assembled and easily produced components to form a doorknob which has heretofore been formed by a variety of mechanically interlocked complicated components. To locate the lock barrel and other mechanisms necessary for completing the doorknob unit the shank 10 is provided with an axially extending slot 18.

To braze the joint between flange 14 and casing 12, it is necessary to deposit a brazing material onto surface 16. This material is usually in paste form and includes a mixture of a brazing alloy and an appropriate flux. The present invention is directed toward an apparatus for applying this paste-like brazing material onto the downwardly sloping surface 16 in a manner so that the material does not slide from the surface before the casing 12 can be positioned thereon.

Figure 3:
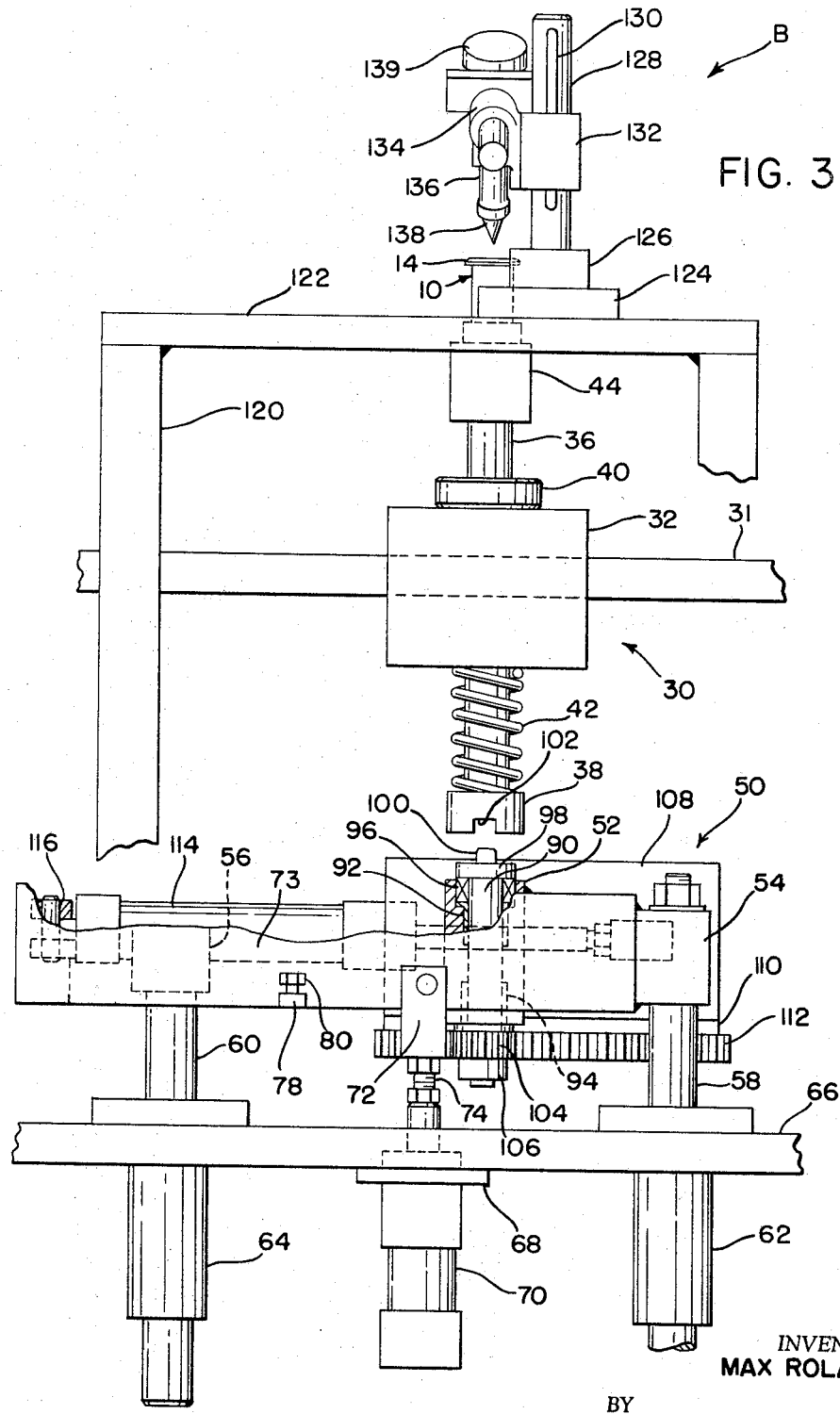
FIGURE 3 is a front elevation, somewhat schematic, cross sectional view illustrating the preferred embodiment of the present invention.

In FIGURES 2 and 3 there is illustrated an apparatus B for depositing the paste-like material onto surface 16. This apparatus B includes a support means 30 comprising an index table 31 which is driven by an appropriate drive arrangement so that the table may be stopped in various predetermined positions to accomplish a plurality of operational functions, one of which is the dispensing of the brazing material onto flange 14. Supported by table 31 is a bracket 32 having an internal, vertically extending guide bore and journal 34 which reciprocally receives rod 36 having a head 38 below the bracket 32 and a stop 40 above the bracket. Between the bracket and head 38 there is provided a bumper spring 42 which will tend to bias head 38 in the downward position and will maintain the stop 40 against bracket 32 when rod 36 is in its unactuated position. The upper end of the rod 36 is provided with a support 44 having a stop 46 and a centering peg 48 so that the shank can be positioned over the peg 48 with the lower end of the shank against stop 46. In this manner, the shank is centered with respect to the rod 36 which centers the shank in a position determined by the position of table 31.

Below head 38, when the table 31 is in the position shown in FIGURES 2 and 3, there is a rotating drive mechanism 50 which includes a support block 52 for mounting various components of the drive mechanism. Outward of the block 52 are spaced lugs 54, 56 each having a downwardly extending post 58, 60, respectively, which posts are journaled within bushings 62, 64 in plate 66 beneath table 31. Also secured onto plate 66 is a collar 68 adapted to mount a cylinder 70 for reciprocating coupling 72 mounted onto block 52 by a longitudinally extending plate 73 which plate is used to support the lugs 54, 56. To adjust the position of coupling 72 with respect to the cylinder 70, there is provided an appropriate adjustment means 74. Spaced lugs 76, 78 are mounted onto plate 73 and receive adjustable stops 80, 82 which coact with a limit switch 84 having an arm 86 with roller 88 so that as the block 52 is moved upwardly or downwardly on posts 58, 60 the limit switch 84 is actuated by adjustable stops 80, 82 to dictate the amount of upward or downward movement of block 52.

Journaled within block 52 there is provided a spindle 90 rotatably received within sleeve bearings 92, 94 and ball bearing 96 so that the spindle can freely rotate within the block 52. Adjacent the upper portion of spindle 90 there is provided a head 98 having a key 100 which is adapted to be received within key slot 102 of head 38. Adjacent the lower end of the spindle there is provided a spur gear 104 secured onto the spindle by collar 106 and a pin 107 therethrough.

Secured onto block 52 on the side opposite plate 73 is a guide plate 108 having a dovetail provided thereon which dovetail is received in a corresponding dovetail slot on a slide 110. Adjacent the lowermost portion of slide 110 is a rack 112 adapted to mesh with spur gear 104 to form a rack and pinion so that longitudinal movement of slide 110 causes rotation of gear 104. To reciprocate the slide there is provided a cylinder 114 secured onto the plate 73 and slide 110 by pivoted mounting pins 116, 118 as is evident from FIGURES 2 and 3.

Actuation cylinder 70 causes key 100 to pass into key slot 102 and, as piston 114 slowly moves slide 110 with respect to block 52, the pinion 104 is rotated by rack 112. The speed of rotation of the head 98, and thus the key 100, is determined by the speed at which cylinder 114 moves slide 110. This speed can be adjusted by a variety of mechanisms so that the shaft 36 may be rotated at any desired speed. As the key 100 is forced into engagement with slot 102, the rod 36 is shifted upwardly to move shank 10 into an uppermost position determined by the adjusted position of stop 80. As so far described, the apparatus B can move shank 10 into an upward position and rotate the same at any selected angular velocity.

Outward of table 31 and rotating drive mechanism 50, there is provided, in accordance with the preferred embodiment of the present invention, a frame 120 mounted onto base plate 66 and having an upward cross bar 122 adapted to receive a support cap 124 which has secured thereto a sleeve 126. Secured within sleeve 126 by a force fit or by an adjustable fit is a post 128 having on one side thereof an axially extending key 130. The key is utilized for aligning adjustable block 132 on post 128 which block carries a mounting bracket 134 for holding a dispenser 136. The key 130 provides proper alignment of the bracket in a rotational direction with respect to the post 128 and the adjustable block is so constructed to allow vertical adjustment of dispenser 136 in an arcuate path.

The upper end of dispenser 136 is closed by a cap 139 and the lower end is provided with a spout 138 pointing downwardly toward flange 14 of shank 10 on peg 48. A paste-like brazing material comprising a mixture of a brazing alloy and an appropriate flux is fed into dispenser 136 through a feed line 140 (best seen in FIGURE 2) which feed line is connected onto the lower portion of reservoir casing 142 so that the material in the reservoir casing can be directed to spout 138 in response to pressure applied within the reservoir casing. To pressure seal the reservoir casing there is provided an upper removable cap 144 with a fitting to connect the interior of the reservoir casing onto pressure line 146 adapted to direct a pressure gas into the casing 142.

To regulate the pressure within line 146 there is provided a conventional regulator valve 148 which is schematically represented in the drawing. Line 146 is connected at the input side of valve 148 to a pressure source 150 for supplying appropriate quantities of pressurized fluid such as air to the valve 148. Within the line 146 there is also provided a control valve 152 for controlling the communication between pressure source 150 and regulator valve 148. The operation of valve 152 is controlled by an appropriately positioned control mechanism 153 which is provided with internal controls that can be actuated by an on-off switch 154 and both by a pulse rate selector 156 and a pulse duration selector 158.

In operation, the mechanism 153 is adjusted by selectors 156 and 158 to determine the rate at which the valve 152 is pulsed and the duration of each pulse. Consequently, the upper portion of reservoir casing 142 is subjected to pulses of pressurized air having a rate and duration determined by the setting of the selectors on the mechanism 153. In like manner, such pulsing of pressurized fluid above the material within reservoir 143 causes the material to be deposited onto flange 14 as it is being rotated by drive mechanism 50.

Figure 4:
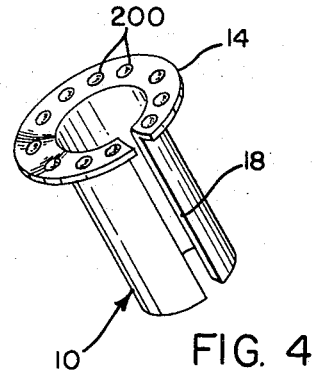
FIGURES 4, 4a, 5, 6 and 6a are enlarged pictorial views illustrating various operational features of the preferred embodiment of the present invention as shown in FIGURES 2 and 3.

Referring now to FIGURE 4, the pulsing of valve 152 causes heaps 200 of paste-like material to be deposited onto flange 14 as the flange is rotated under the spout 138. The disposition of the heaps 200 is better shown in the enlarged view of FIGURE 4a wherein it is seen that the flange 14 is concave in upper contour. These heaps of paste-like material are spread on the flange 14 when a knob casing 12 is pressed against the flange 14.

Figure 4A:
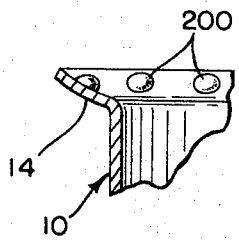
Figure 5:
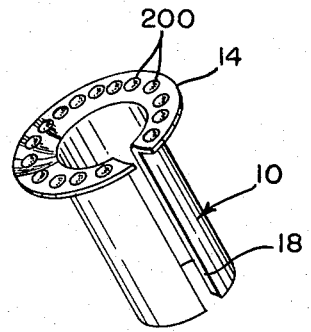

FIGURE 5 illustrates a shank 10 having an upper flange 14 with spaced heaps 200 of the paste-like brazing material deposited on the upper surface thereof. This shank 10 does not differ substantially from the shank shown in FIGURES 4 and 4a with the exception that the heaps 200 are closer together than are the heaps of material in FIGURE 4. The greater number of heaps on flange 14 result from either decreasing the rotational speed of key 100 or increasing the pulsing rate of valve 152 by adjusting selector 156. The latter adjustment is usually more convenient in actual operation. Rotation of the shank 10 under the spout 138 causes the spaced heaps of flux material to be deposited onto flange 14; however, it is appreciated that the shank could be held stationary and the spout 138 could be moved around the flange without departing from the intended spirit and scope of the present invention.

Figure 6A:
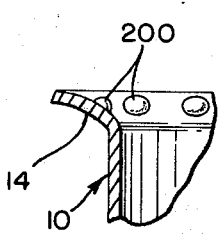
Figure 6:
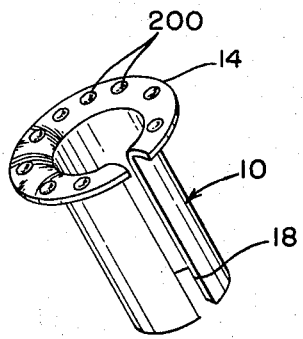

Referring now to FIGURES 6 and 6a, there is disclosed a shank 10 having a mounting flange 14 with an upper convex surface similar to the surface 16 of FIGURE 1. Brazing material is deposited on such a convex flange 14 in a manner similar to depositing the flux onto the concave flange as shown in FIGURES 4, 4a and 5. It is illustrated in FIGURES 6 and 6a that the amount of material forming each heap 200 can be increased when it is necessary to provide a greater amount of brazing material at each spaced position along the flange 14. Adjustment of the amount of material forming heaps 200 is accomplished, most conveniently, by adjusting selector 158 which adjusts the time that the valve 152 is open and, thus, adjusts the time which lapses while the material in reservoir casing 142 is subjected to pressure from valve 148.

It is appreciated that various other arrangements could be provided for pulsing the material through spout 138 without departing from the intended spirit and scope of the present invention.

By providing the brazing material in small heaps around the upper surface of flange 14, the material does not tend to slide from the sloping surface and provides uniform brazing of casing 12 onto the upper surface of the flange. When a continuous bead of the material is placed onto the flange it apparently contracts and causes the bead to be pulled down the sloping flange and often off of the flange. This problem is eliminated when the spaced heaps are deposited onto the flange.

It is appreciated that various structural changes may be made in the preferred embodiment of the present invention without departing from the intended spirit and scope of the present inventon; for instance, it is within the contemplation of the present invention to provide a means for simultaneously applying all of the spaced heaps 200 onto the upper sloping surface of flange 14 without requiring rotation of the flange with respect to the applicator.

Having thus described my invention, I claim:

An apparatus for applying a paste-like brazing material in a generally circular path on an annular flange of a workpiece preparatory to brazing a member onto said flange, said apparatus comprising:
  (a) means for supporting said workpiece with said flange facing upwardly;
  (b) an applicator having a single spout directed downwardly toward said flange and a reservoir connected to said applicator for holding a supply of said material, fluid pressure on said material in said reservoir being adapted to force material through said spout and onto said flange;
  (c) means for causing relative rotative movement between said means for supporting said workpiece and said single spout so that said spout remains adjacent said flange and traces said path for at least one revolution; and,
  (d) means for applying a number of pulses of fluid pressure on said material in said reservoir during said revolution along said path to deposit, sequentially and successively, a number of discrete heaps of said material onto said flange and along said path, said number of heaps being the same as said number of pulses.

References Cited

UNITED STATES PATENTS

| | | | |
|---|---|---|---|
| 2,432,795 | 12/1947 | Pearson et al. | 118—320 X |
| 2,550,335 | 4/1951 | Dailey | 118—320 X |
| 2,608,177 | 8/1952 | Powers | 118—320 |
| 2,846,335 | 8/1958 | Alholm et al. | |
| 3,053,221 | 9/1962 | Heffley et al. | 118—318 X |

CHARLES A. WILLMUTH, *Primary Examiner.*

J. P. McINTOSH, *Assistant Examiner.*